US012688810B2

(12) United States Patent
Zhou et al.

(10) Patent No.: US 12,688,810 B2
(45) Date of Patent: Jul. 21, 2026

(54) DISPLAY PANEL HAVING SHIFT REGISTER MODULE WITH REFRESH DRIVING UNIT AND REFRESH CONTROL UNIT FOR PARTITIONED DISPLAY REFRESH, AND DISPLAY DEVICE

(71) Applicant: Xiamen Tianma Display Technology Co., Ltd., Xiamen (CN)

(72) Inventors: Xingyao Zhou, Xiamen (CN); Lei Wang, Xiamen (CN); Yana Gao, Xiamen (CN); Qingjun Lai, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 10 days.

(21) Appl. No.: 18/924,171

(22) Filed: Oct. 23, 2024

(65) Prior Publication Data

US 2026/0051275 A1 Feb. 19, 2026

(30) Foreign Application Priority Data

Aug. 13, 2024 (CN) ......................... 202411110238.X

(51) Int. Cl.
*G09G 3/20* (2006.01)

(52) U.S. Cl.
CPC ....... *G09G 3/20* (2013.01); *G09G 2310/0267* (2013.01); *G09G 2310/0286* (2013.01); *G09G 2310/04* (2013.01); *G09G 2320/0257* (2013.01); *G09G 2340/0435* (2013.01)

(58) Field of Classification Search
CPC ........................................................ G09G 3/20
See application file for complete search history.

(56) References Cited

U.S. PATENT DOCUMENTS

2023/0027673 A1* 1/2023 Jeong ................... G09G 3/3266
2025/0124879 A1* 4/2025 Shang .................. G09G 3/3266

* cited by examiner

*Primary Examiner* — Gustavo Polo
(74) *Attorney, Agent, or Firm* — Anova Law Group, PLLC

(57) ABSTRACT

A display panel includes a driving circuit including a first refresh driving line and N stages of first shift register modules. A first shift register module includes a first shift output unit, a refresh driving unit and a refresh control unit. First signal end of the refresh driving unit is connected to the first refresh driving line, second signal end of the refresh driving unit is connected to a trigger signal end, and output end of the refresh driving unit is connected to first end of the refresh control unit, second end of the refresh control unit is connected to output end of the first shift output unit, output end of the refresh control unit is connected to a row of sub-pixels, and the refresh driving unit is configured to provide a pulse control signal to control a valid pulse output duration of the refresh control unit.

20 Claims, 12 Drawing Sheets

DISPLAY PANEL HAVING SHIFT REGISTER MODULE WITH REFRESH DRIVING UNIT AND REFRESH CONTROL UNIT FOR PARTITIONED DISPLAY REFRESH, AND DISPLAY DEVICE

CROSS-REFERENCE TO RELATED APPLICATION

The present application claims priority of Chinese Patent Application No. 202411110238.X, filed on Aug. 13, 2024, the entire content of which is hereby incorporated by reference.

TECHNICAL FIELD

The present application relates to the field of display technology, in particular to a display panel and a display device.

BACKGROUND

With the rapid development of display technology, display screens based on multi-zone dynamic refresh technology have emerged. Displays using multi-zone dynamic refresh technology may perform different refresh rates in the dynamic picture area and static picture area of the display area, or may present different refresh rates in the human eye observation area and non-human eye observation area of the display area, thereby realizing partitioned display control of the display area. In this way, both refresh rate requirements and low power consumption requirements may be accounted for.

However, current display screens with a partitioned refresh function have display problems such as image sticking or screen jitter.

SUMMARY

One aspect of the present disclosure provides a display panel including a first driving circuit and a plurality of rows od sub-pixels, where the first driving circuit includes a first refresh driving line and a multi-stage shift register module, where a stage of shift register module is correspondingly connected to at least a row of sub-pixels, and a shift register module includes a first shift output unit; in the multi-stage shift register module, there are N stages of shift register modules being N stages of first shift register modules, N≥2; and a first shift register module also includes a refresh driving unit and a refresh control unit, where a first signal end of the refresh driving unit is connected to the first refresh driving line, a second signal end of the refresh driving unit is connected to a trigger signal end, and an output end of the refresh driving unit is connected to a first end of the refresh control unit, a second end of the refresh control unit is connected to an output end of the first shift output unit, an output end of the refresh control unit is connected to a row of sub-pixels, and the refresh driving unit is configured to provide a pulse control signal to control a valid pulse output duration of the refresh control unit.

Another aspect of the present disclosure provides a display device, including the display panel. The display panel includes including a first driving circuit and a plurality of rows od sub-pixels, where the first driving circuit includes a first refresh driving line and a multi-stage shift register module, where a stage of shift register module is correspondingly connected to at least a row of sub-pixels, and a shift register module includes a first shift output unit; in the multi-stage shift register module, there are N stages of shift register modules being N stages of first shift register modules, N≥2; and a first shift register module also includes a refresh driving unit and a refresh control unit, where a first signal end of the refresh driving unit is connected to the first refresh driving line, a second signal end of the refresh driving unit is connected to a trigger signal end, and an output end of the refresh driving unit is connected to a first end of the refresh control unit, a second end of the refresh control unit is connected to an output end of the first shift output unit, an output end of the refresh control unit is connected to a row of sub-pixels, and the refresh driving unit is configured to provide a pulse control signal to control a valid pulse output duration of the refresh control unit.

Other aspects of the present disclosure may be understood by those skilled in the art in light of the description, the claims, and the drawings of the present disclosure.

BRIEF DESCRIPTION OF THE DRAWINGS

In order to more clearly illustrate the technical solutions of the embodiments of the present disclosure, the drawings required for use in the embodiments will be briefly introduced below. Apparently, the drawings described below are only some embodiments of the present disclosure. For persons having ordinary skills in the art, other drawings may be obtained based on these drawings without making creative efforts.

DETAILED DESCRIPTION

In order to enable persons skilled in the art to better understand the present disclosure, the technical solutions in embodiments of the present disclosure will be described in detail below in conjunction with the accompanying drawings in embodiments of the present disclosure. Apparently, the specific embodiments described herein are only to explain the present disclosure and not to limit the present disclosure. Based on embodiments of the present disclosure, all other embodiments obtained by persons having ordinary skills in the art without making creative efforts shall fall within the scope of protection of the present disclosure.

It should be noted that in this disclosure, relational terms, such as "first" and "second", are only configured to distinguish one entity or operation from another entity or operation, and do not necessarily require or imply one of these entities or operations to have any such actual relationship or order between. Moreover, the terms "include", "contain" or any other variants thereof are intended to cover a non-exclusive inclusion. Exemplarily, a process, method, system, product or equipment that includes a series of steps or elements is not necessarily limited to those steps or elements that are explicitly listed but may include steps or elements that are not explicitly listed or those that are inherent to the process, method, system, product or equipment.

Figure 1:
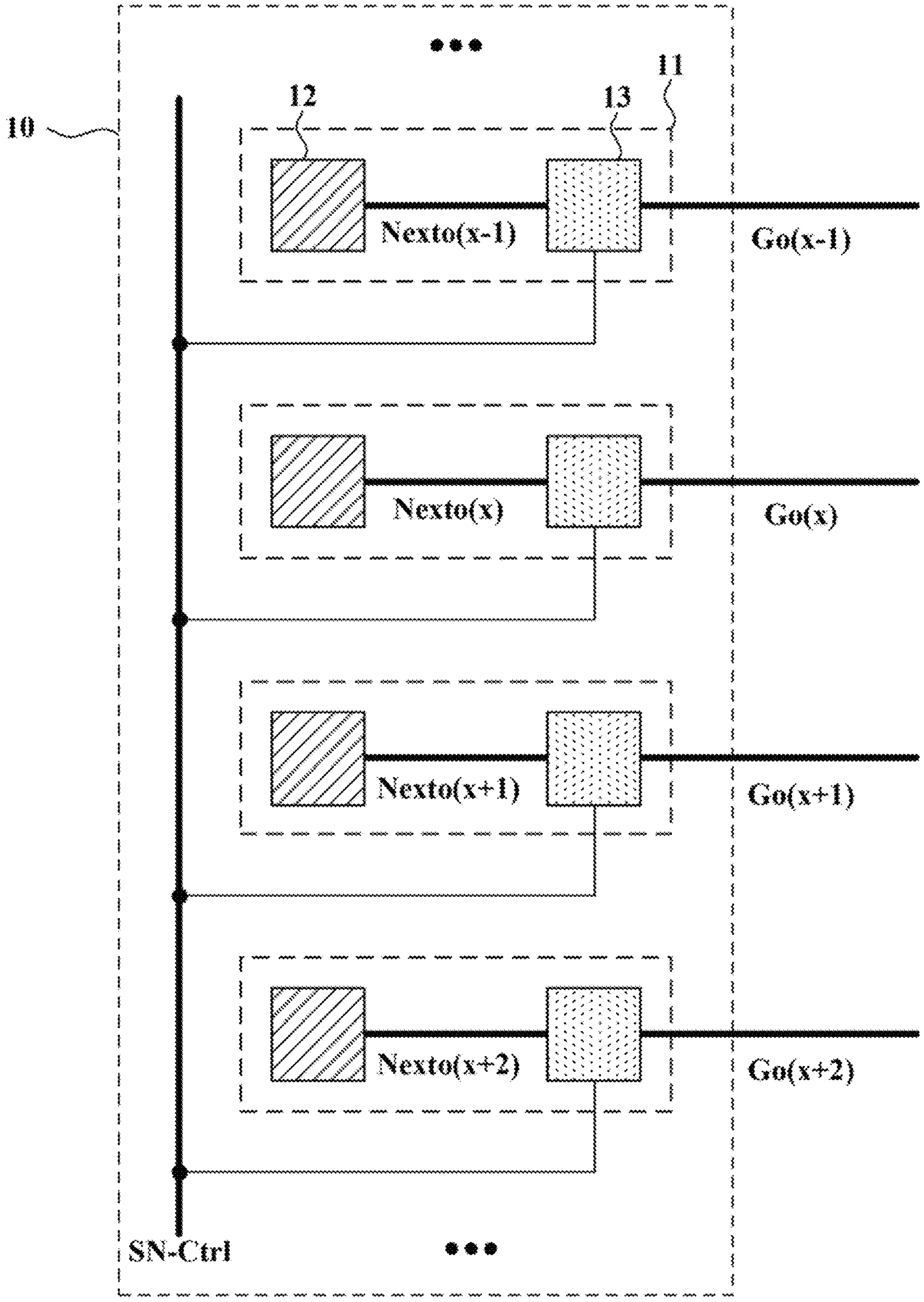
FIG. 1 is a schematic diagram of a gate driving circuit configured for partitioned refresh control.

FIG. 1 is a schematic diagram of a gate driving circuit configured for partitioned refresh control, where the gate driving circuit 10 is arranged in a non-display area of a display screen, and may perform partitioned refresh control to enable the display screen to implement partitioned display. As shown in FIG. 1, the gate driving circuit 10 includes a Q-stage shift register unit 11, where a shift register unit 11 includes a shift register 12. The Q-stage shift register unit 11 includes at least (x−3)-th stage to (x+1)-th stage shift register units 11. For any one of the (x−3)-th stage to the (x+1)-th stage shift register units 11, a refresh controller 13 is also included, and an output end Nexto of a shift register 12 is connected to a signal end of the refresh controller 13. A control end of the refresh controller 13 is connected to a refresh control signal line SN-Ctrl, and an output end Go of the refresh controller 13 outputs a gate driving signal.

Figure 2:
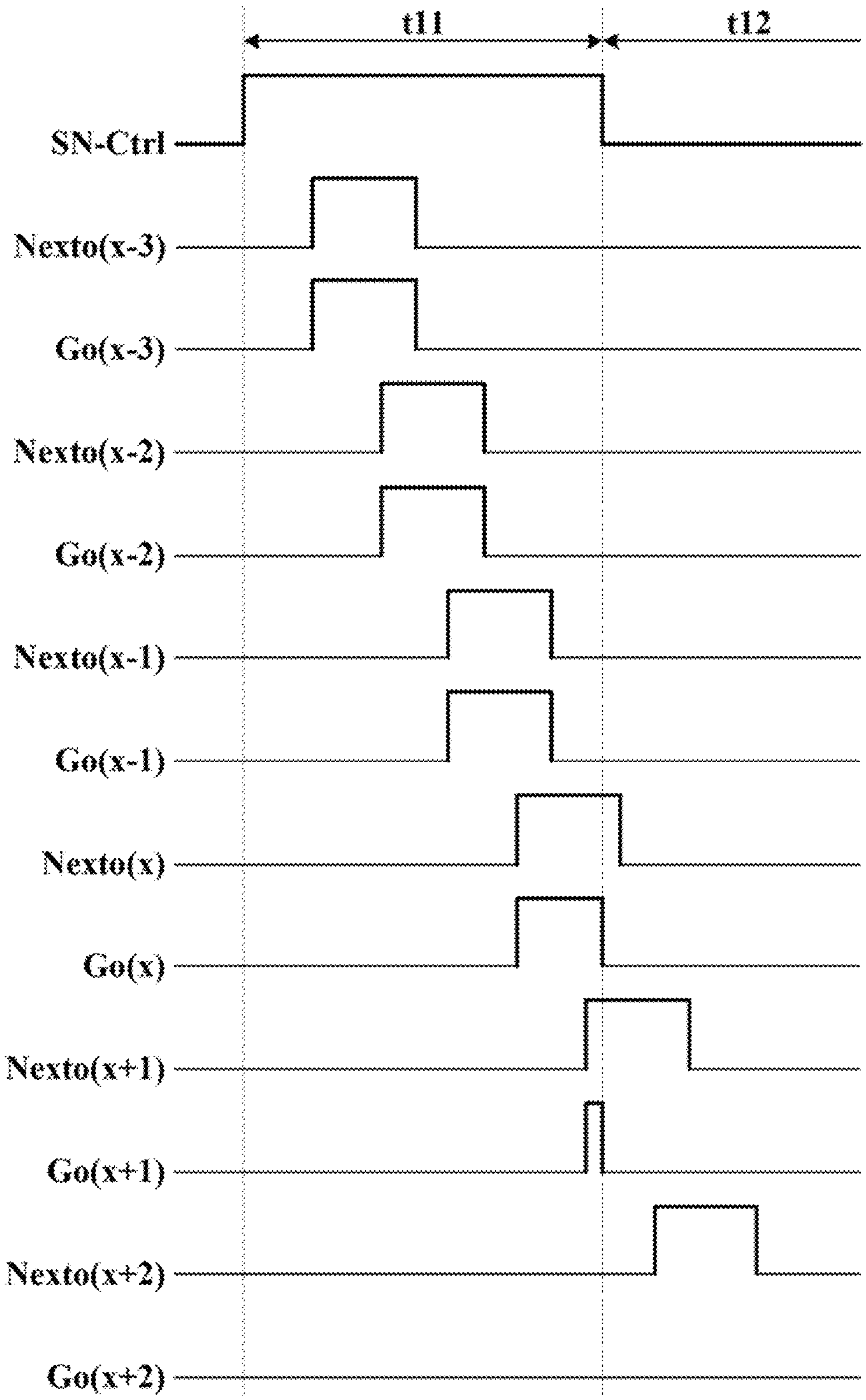
FIG. 2 is a timing diagram of the gate driving circuit shown in FIG. 1.

FIG. 2 is a timing diagram of the gate driving circuit shown in FIG. 1. Refer to FIG. 1 and FIG. 2, optionally, a display area corresponding to the (x−3)-th stage to the (x+1)-th stage shift register units 11 in the gate driving circuit 10 is a first partition. When the refresh control signal line SN-Ctrl provides a high level signal, the gate driving circuit 10 controls the first partition to refresh. When the refresh control signal line SN-Ctrl provides a low level signal, the gate driving circuit 10 controls the first partition to stop refreshing.

In the first phase t11, the refresh control signal line SN-Ctrl provides a high level signal.

First, the output end Nexto(x−3) of the shift register 12 of the (x−3)-th stage shift register unit 11 outputs a high level signal, so that the output end Go(x−3) of the refresh controller 13 of the (x−3)-th stage shift register unit 11 outputs a high level signal, and a corresponding sub-pixel row is refreshed.

Sequentially, the output end Nexto(x−2) of the shift register 12 of the (x−2)-th stage shift register unit 11 outputs a high level signal, so that the output end Go(x−2) of the refresh controller 13 of the (x−2)-th stage shift register unit 11 outputs a high level signal, and a corresponding sub-pixel row is refreshed.

Sequentially, the output end Nexto(x−1) of the shift register 12 of the (x−1)-th stage shift register unit 11 outputs a high level signal, so that the output end Go(x−1) of the refresh controller 13 of the (x−1)-th stage shift register unit 11 outputs a high level signal, and a corresponding sub-pixel row is refreshed.

Sequentially, the output end Nexto(x) of the shift register 12 of the x-th stage shift register unit 11 outputs a high level signal, so that the output end Go(x) of the refresh controller 13 of the x-th stage shift register unit 11 outputs a high level signal. However, in the process of the output end Nexto(x) of the shift register 12 outputting the high level signal, the refresh control signal line SN-Ctrl provides a low level signal to enter the second phase t12, so that a valid pulse (high level) of the output end Go(x) of the refresh controller 13 is cut off, and the high level duration of the output end Go(x) of the refresh controller 13 is shorter than that of the previous stage refresh controller 13. The refresh duration of a sub-pixel row corresponding to the x-th stage shift register unit 11 is then shorter than that of the previous row, causing screen jitter or image sticking.

Sequentially, the output end Nexto(x+1) of the shift register 12 of the (x+1)-th stage shift register unit 11 outputs a high level signal, so that the output end Go(x+1) of the refresh controller 13 of the (x+1)-th stage shift register unit 11 outputs a high level signal. When entering the second phase t12, the valid pulse of the output end Go(x+1) of the refresh controller 13 is cut off, and the refresh duration of a sub-pixel row corresponding to the (x+1)-th stage shift register unit 11 is further reduced.

In the second phase t12, the refresh control signal line SN-Ctrl provides a low level signal, the output end Nexto (x+2) of the shift register 12 of the (x+2)-th stage shift register unit 11 outputs a high level signal, so that the output end Go(x+2) of the refresh controller 13 of the (x+2)-th stage shift register unit 11 outputs a low level signal, and a corresponding sub-pixel row is not refreshed.

As described above, starting from the x-th stage shift register unit 11, the refresh duration of the corresponding sub-pixel row is gradually reduced, which may cause image sticking or screen jitter in the first partition, affecting the display performance.

Figure 3:
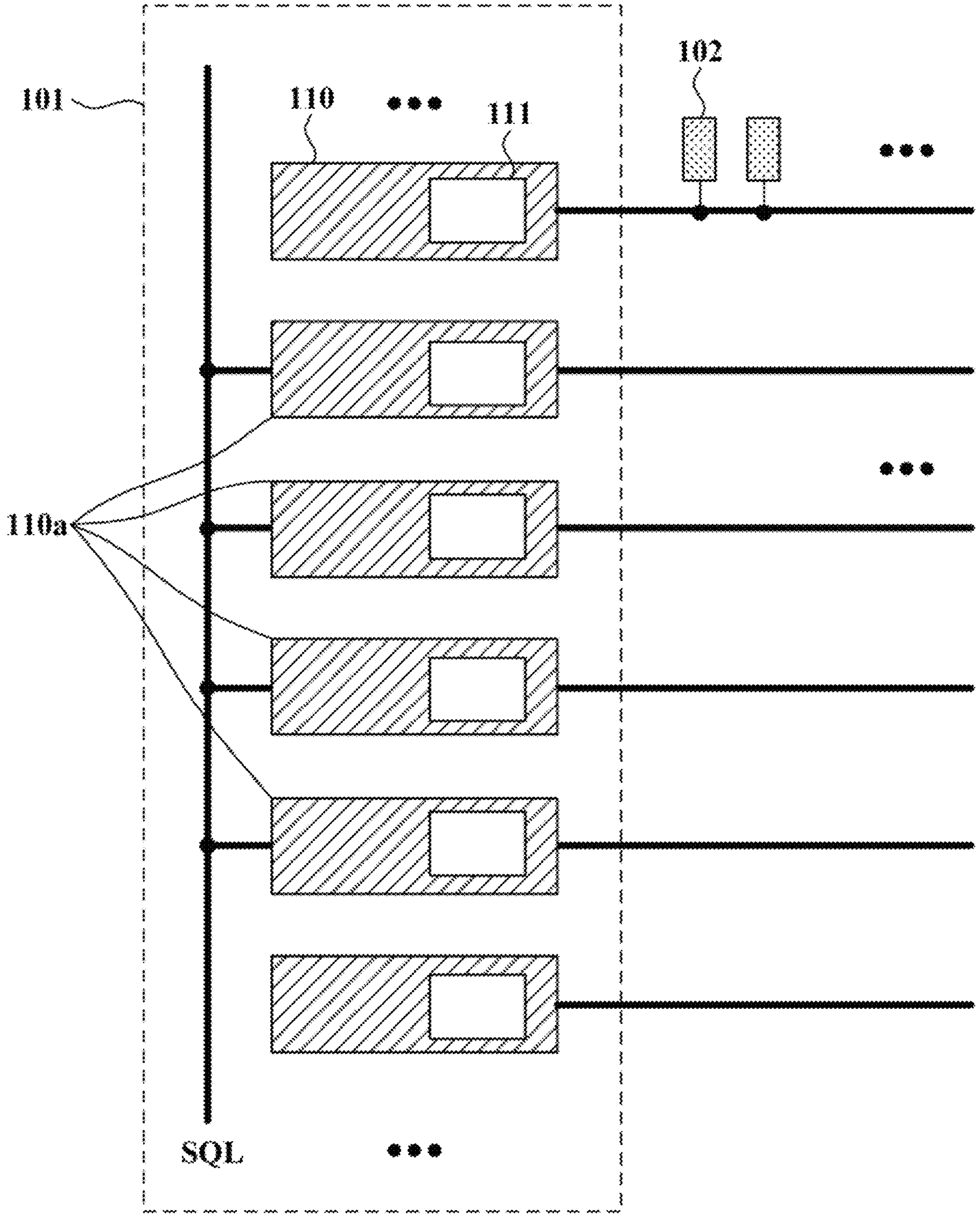
FIG. 3 is a schematic diagram of a display panel in accordance with an embodiment of the present disclosure.
Figure 4:
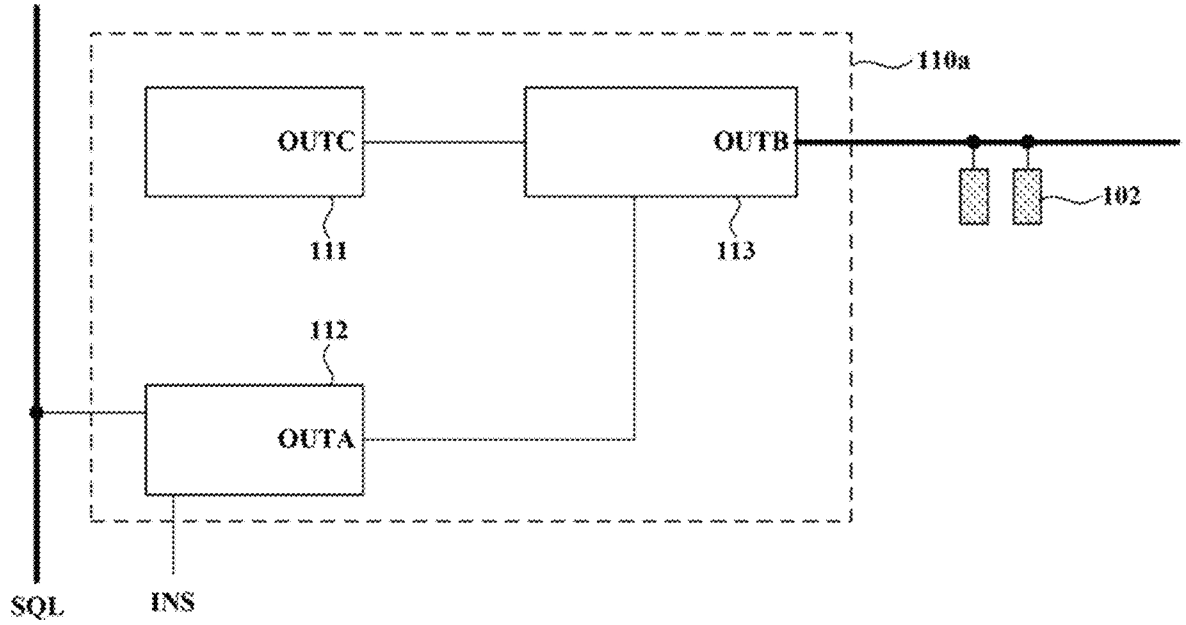
FIG. 4 is a schematic diagram of a first shift register module in accordance with an embodiment of the present disclosure.

In order to solve the above problems, embodiments of the present disclosure provide a display panel to solve the problem of image sticking or screen jitter that is prone to occur in partitioned display, which improves the display performance. FIG. 3 is a schematic diagram of a display panel in accordance with an embodiment of the present disclosure, and FIG. 4 is a schematic diagram of a first shift register module in accordance with an embodiment of the present disclosure. As shown in FIG. 3 and FIG. 4, the display panel includes a first driving circuit 101 and multiple sub-pixel rows 102, where the first driving circuit 101 includes a first refresh driving line SQL and a multi-stage shift register module 110. One stage of shift register module 110 is correspondingly connected to at least one sub-pixel row 102, and a shift register module 110 includes a first shift output unit 111. In the multi-stage shift register module 110, there are N stages of shift register modules 110 (also referred to as N-stage shift register module 110) that are first shift register modules 110*a* (also referred to as N-stage first shift register 110*a*), N≥2. A first shift register module 110*a* further includes a refresh driving unit 112 and a refresh control unit 113. A first signal end of the refresh driving unit 112 is connected to the first refresh driving line SQL, a second signal end of the refresh driving unit 112 is connected to a trigger signal end INS, and the output end OUTA of the refresh driving unit 112 is connected to a first end of the refresh control unit 113. A second end of the refresh control unit 113 is connected to the output end OUTC of the first shift output unit 111, the output end OUTB of the refresh control unit 113 is connected to sub-pixels 102. The refresh driving unit 112 is configured to provide a pulse control signal to control a valid pulse output duration of the refresh control unit 113.

In the disclosed embodiment, the first driving circuit 101 includes the first refresh driving line SQL and the multi-stage shift register module 110, where one stage of shift register module 110 is correspondingly connected to at least one sub-pixel row 102, and a shift register module 110 includes a first shift output unit 111. That is, each stage of shift register module 110 includes a first shift output unit 111. A shift register module 110 is configured to provide a first driving signal to a corresponding sub-pixel row or rows 102.

The multi-stage shift register module 110 includes N stages of shift register modules 110 that are N stages of first shift register modules 110*a*, where N≥2. A first shift register module 110*a* includes a first shift output unit 111, and also includes a refresh driving unit 112 and a refresh control unit 113. It should be noted that a display area of the display panel includes a first display partition, and the first display partition may be a dynamic picture area or a human eye observation area of the display panel. The multi-stage shift register module 110 corresponding to the first display partition is then configured to be a multi-stage first shift register module 110*a*. The display panel controls the N-stage first shift register module 110*a* to implement a partition refresh function. When the first refresh driving line SQL provides a refresh start signal, the N-stage first shift register module 110*a* works to refresh the first display partition. When the first refresh driving line SQL provides a refresh stop signal, the first driving circuit 101 controls pixel rows after the first display partition to stop refreshing.

It should be understood that for the first shift register modules 110*a*, the output end OUTB of the refresh control unit 113 is connected to the sub-pixels 102 to provide the first driving signal, while for the other shift register modules 110, it is the output end OUTC of the first shift output unit 111 that is connected to the sub-pixels 102 to provide the first driving signal.

In a first shift register module 110*a*, the first shift output unit 111 and the refresh driving unit 112 are respectively connected to the refresh control unit 113. Specifically, the first signal end of the refresh driving unit 112 is connected to the first refresh driving line SQL, the second signal end of the refresh driving unit 112 is connected to the trigger signal end INS, the output end OUTA of the refresh driving unit 112 is connected to the first end of the refresh control unit 113, the output end OUTC of the first shift output unit 111 is connected to the second end of the refresh control unit 113, and the output end OUTB of the refresh control unit 113 is connected to the sub-pixel 102. Based on the signal provided by the first refresh driving line SQL and the signal provided by the trigger signal end INS, the output end OUTA of the refresh driving unit 112 outputs a pulse control signal. The output end OUTC of the first shift output unit 111 outputs a first shift signal to drive the refresh control unit 113 to output a valid pulse or an invalid pulse according to the pulse control signal and the first shift signal. The pulse control signal provided by the refresh driving unit 112 may control the valid pulse output duration of the refresh control unit 113.

In FIG. 2, starting from the x-th stage shift register unit 11, the refresh duration of the corresponding sub-pixel row is gradually reduced, which may cause image sticking or screen jitter in the first partition area, affecting the display performance.

In the present disclosure, a refresh driving unit is additionally provided. The refresh driving unit provides a pulse control signal under the control of the first refresh driving line and the trigger signal end. The pulse control signal may control an output duration of a valid pulse of the refresh control unit, so that the output signal of each stage of first shift register module corresponding to the display partition may be complete, and the problem of a valid pulse output by the last stage first shift register module corresponding to the display partition being cut off will not occur. In this way, problems such as image sticking or screen jitter may be prevented from occurring in the display partition, thereby improving the display performance.

Figure 5:
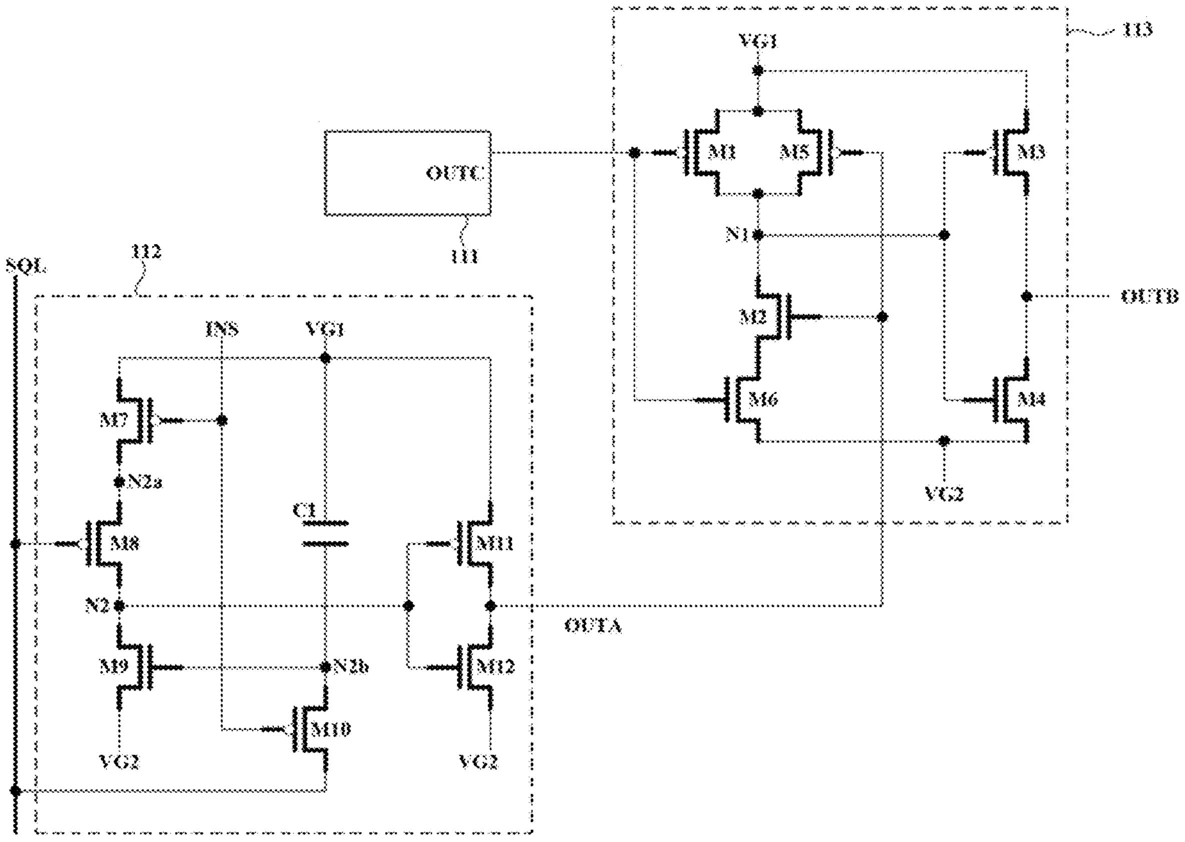
FIG. 5 is a schematic diagram of another first shift register module in accordance with an embodiment of the present disclosure.

FIG. 5 is a schematic diagram of another first shift register module in accordance with an embodiment of the present disclosure. Refer to FIG. 4 and FIG. 5, optionally, a refresh control unit 113 includes: a first transistor M1, a second transistor M2, a third transistor M3 and a fourth transistor M4. The gate of the first transistor M1 is connected to the output end OUTC of a first shift output unit 111, and the first transistor M1 is connected between a first power supply end VG1 and a first node N1. The gate of the second transistor M2 is connected to the output end OUTA of a refresh driving unit 112, and the second transistor M2 is connected between a second power supply end VG2 and the first node N1. The gate of the third transistor M3 and the gate of the fourth transistor M4 are both connected to the first node N1, the output end of the third transistor M3 and the output end of the fourth transistor M4 are both connected to the output end OUTB of the refresh control unit 113. The input end of the third transistor M3 is connected to the first power supply end VG1, and the input end of the fourth transistor M4 is connected to the second power supply end VG2.

In the disclosed embodiment, optionally, the valid pulse output by the first shift register module 110*a* is at a high level. Accordingly, the first power supply end VG1 optionally provides a high level signal, and the second power supply end VG2 provides a low level. In other embodiments, if the valid pulse output by the first shift register module is at a low level, the level of the signal provided by the first power supply end and the second power supply end is adaptively adjusted.

Optionally, the first transistor M1 and the third transistor M3 may be of the same transistor type, and the second transistor M2 and the fourth transistor M4 may be of the same transistor type.

In the disclosed embodiment, the first transistor M1 and the third transistor M3 may be P-type transistors PMOS, and the second transistor M2 and the fourth transistor M4 may be N-type transistors NMOS. In other embodiments, the types of each transistor may be reasonably adjusted according to product requirements, and are not limited to those shown in FIG. 5.

Optionally, the refresh control unit 113 further includes a fifth transistor M5 and a sixth transistor M6. The gate of the fifth transistor M5 is connected to the output end OUTA of the refresh driving unit 112, and the fifth transistor M5 is connected between the first power supply end VG1 and the first node N1. The gate of the sixth transistor M6 is connected to the output end OUTC of the first shift output unit 111, and the second transistor M2 is connected to the second power supply end V2 through the sixth transistor M6. Optionally, the transistor types of the fifth transistor M5 and the sixth transistor M6 are different. Optionally, the first transistor M1, the third transistor M3 and the fifth transistor M5 are all P-type transistors, and/or the second transistor M2, the fourth transistor M4 and the sixth transistor M6 are all N-type transistors.

In the disclosed embodiment, the fifth transistor M5 may be a P-type transistor PMOS, the sixth transistor M6 may be an N-type transistor NMOS. In other embodiments, the types of each transistor may be reasonably adjusted according to product requirements, and are not limited to those shown in FIG. 5.

Optionally, the refresh driving unit 112 includes a seventh transistor M7, an eighth transistor M8, a ninth transistor M9, a tenth transistor M10, an eleventh transistor M11, a twelfth transistor M12 and a first capacitor C1. The seventh transistor M7, the eighth transistor M8 and the ninth transistor M9 are connected in sequence, the gate of the seventh transistor M7 is connected to a trigger signal end INS and another end of the seventh transistor M7 is connected to the first power supply end VG1. The gate of the eighth transistor M8 is connected to the first refresh driving line SQL, the gate of the ninth transistor M9 is connected to a first end of the tenth transistor M10 and another end of the ninth transistor M9 is connected to the second power supply end VG2. The eighth transistor M8 is connected to the trigger signal end INS and another end of the eighth transistor M8 is connected to the first power supply end VG1. The connection point between the transistor M8 and the ninth transistor M9 is a second node N2. The gate of the tenth transistor M10 is connected to the trigger signal end INS and a second end of the tenth transistor M10 is connected to the first refresh driving line SQL. A first end of the tenth transistor M10 is connected to the first power supply end VG1 through the first capacitor C1. The gate of the eleventh transistor M11 and the gate of the twelfth transistor M12 are both connected to the second node N2. The eleventh transistor M11 is connected between the first power supply end VG1 and the output end OUTA of the refresh driving unit 112, and the twelfth transistor M12 is connected between the second power supply end VG2 and the output end OUTA of the refresh driving unit 112.

Optionally, the seventh transistor M7, the eighth transistor M8, the tenth transistor M10 and the eleventh transistor M11 are of the same transistor type, and the ninth transistor M9 and the twelfth transistor M12 are of the same transistor type.

In the disclosed embodiment, the seventh transistor M7, the eighth transistor M8, the tenth transistor M10 and the eleventh transistor M11 may be P-type transistors PMOS, and the ninth transistor M9 and the twelfth transistor M12 may be N-type transistors NMOS. In other embodiments, the types of each transistor may be reasonably adjusted according to product requirements, and are not limited to those shown in FIG. 5.

Optionally, the refresh start signal provided by the first refresh driving line SQL is at a high level, and the refresh stop signal provided by the first refresh driving line SQL is at a low level. Optionally, a valid pulse provided by the trigger signal end INS is at a high level, and an invalid pulse provided by the trigger signal end INS is at a low level. Optionally, a valid pulse provided by the output end OUTC of the first shift output unit 111 is at a high level, and an invalid pulse provided by the output end OUTC of the first shift output unit 111 is a low level.

Figure 6:
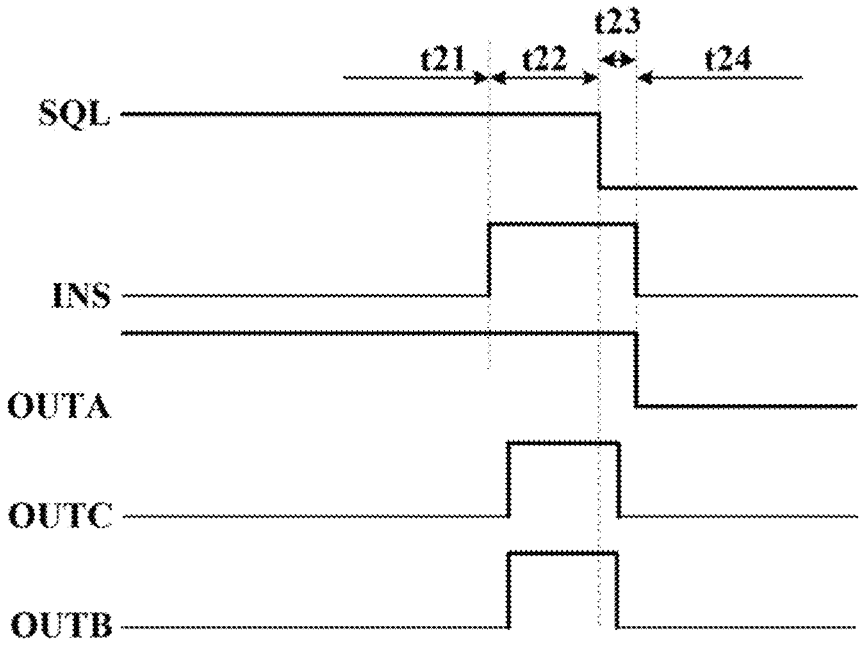
FIG. 6 is a timing diagram of the first shift register module shown in FIG. 5.

FIG. 6 is a timing diagram of the first shift register module shown in FIG. 5. Optionally, the first shift register module is the last stage first shift register module corresponding to the first display partition. During the process of the output end OUTC of the first shift output unit 111 of the first shift register module outputting a valid pulse, the electrical signal of the first refresh driving line SQL leaps from a high level to a low level.

A working process of the first shift register module includes:

In the t21 stage, the first refresh driving line SQL provides a high level, so that the eighth transistor M8 is turned off. The trigger signal end INS provides a low level, so that the seventh transistor M7 and the tenth transistor M10 are both turned on, then the node N2*a* is at a high level, the node N2*b* is at a high level, and the first capacitor C1 is charged. The ninth transistor M9 is turned on, and the low level signal provided by the second power supply end VG2 is written into the second node N2. The eleventh transistor M11 is turned on, and the high level signal provided by the first power supply end VG1 is written into the output end OUTA of the refresh driving unit 112.

In the stage t22, the eighth transistor M8 remains turned off. The trigger signal end INS provides a high level, so that the seventh transistor M7 and the tenth transistor M10 are both turned off, and the first capacitor C1 discharges to the node N2*b* so that the node N2*b* maintains a high level. The ninth transistor M9 is turned on, the second node N2 is at a low level, the eleventh transistor M11 is turned on, and the output end OUTA of the refresh driving unit 112 outputs a high level.

In the stage t23, the first refresh driving line SQL provides a low level, so that the eighth transistor M8 is turned on. The seventh transistor M7 and the tenth transistor M10 remain turned off, the first capacitor C1 continues to discharge to the node N2*b* so that the node N2*b* maintains a high level, the ninth transistor M9 and the eleventh transistor M11 are turned on, and the output end OUTA of the refresh driving unit 112 outputs a high level.

In the t24 stage, the first refresh driving line SQL provides a low level to turn on the eighth transistor M8. The trigger signal end INS provides a low level to turn on the seventh transistor M7 and the tenth transistor M10, then the node N2*b* is at a low level, and the ninth transistor M9 is turned off. The high level signal provided by the first power supply end VG1 is written into the second node N2, the twelfth transistor M12 is turned on, and the low level signal provided by the second power supply end VG2 is written into the output end OUTA of the refresh driving unit 112.

As described above, the discharge duration of the first capacitor C1 is much shorter than the charge duration of the first capacitor C1, that is, the sum of the duration of t22+t23 is much shorter than the duration of the t21 stage. Accordingly, when the trigger signal end INS is at a high level, the discharge of the first capacitor C1 may maintain the node N2*b* at a high level, thereby ensuring that the output end OUTA of the refresh driving unit 112 outputs a high level when the trigger signal end INS is at a high level. When the trigger signal end INS is at a high level, the change of the first refresh driving line SQL from a high level to a low level will not cut off the outputting of a high level by the output end OUTA of the refresh driving unit 112.

In the duration when the output end OUTA of the refresh driving unit 112 provides a high level, the output end OUTC of the first shift output unit 111 provides a valid pulse, i.e., a high level signal, so that the second transistor M2 and the sixth transistor M6 are both turned on, and the first node N1 is at a low level. The third transistor M3 is then turned on, and a high level signal provided by the first power supply end VG1 is written into the output end OUTB of the refresh control unit 113. Therefore, the process in which the output end OUTB of the refresh control unit 113 outputs a valid pulse of a high level will not be cut off by a high-low level leap of the first refresh driving line SQL.

When the output end OUTA of the refresh driving unit 112 provides a low level signal, the fifth transistor M5 is turned on, the first node N1 is at a high level, the fourth transistor M4 is turned on, and the low level signal provided by the second power supply end VG2 is written to the output end OUTB of the refresh control unit 113, and the first driving circuit controls a corresponding pixel row to stop refreshing.

Compared to FIG. 2, when the electrical signal of the first refresh driving line SQL leaps from a high level to a low level, if the trigger signal end INS is at a high level, the process of the output end OUTA of the refresh driving unit 112 outputting a valid pulse will not be cut off by the high-low level leap of the first refresh driving line SQL. Sequentially, after the trigger signal end INS leaps from a high level to a low level, the output end OUTA of the refresh driving unit 112 leaps from a valid pulse to an invalid pulse, and a pulse control signal of the refresh driving unit 112 is used to control the refresh control unit 113, thereby avoiding a valid pulse of the refresh control unit 113 from being cut off by the first refresh driving line SQL, thereby preventing problems such as image sticking or screen jitter from occurring in the display partition, which improves the display performance.

Figure 7:
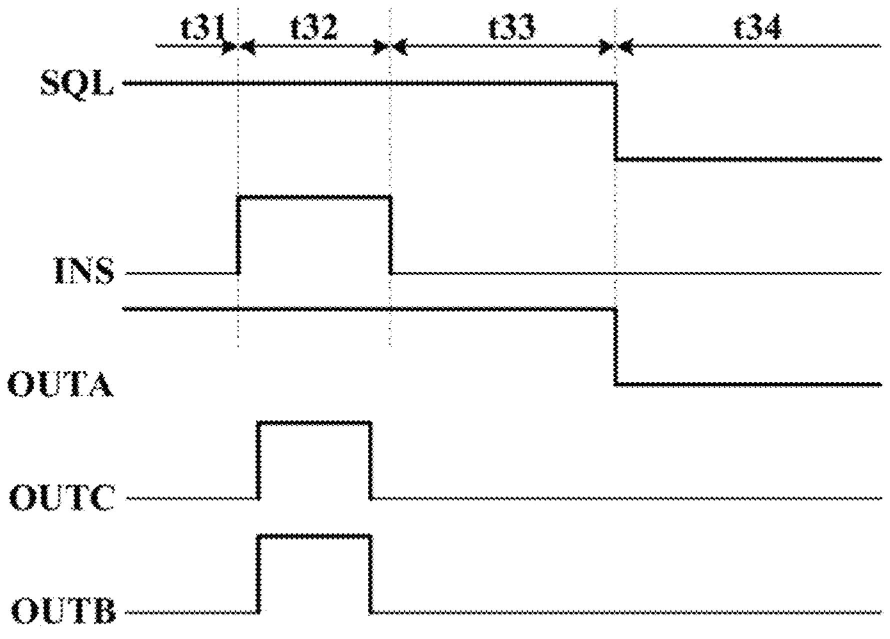
FIG. 7 is another timing diagram of the first shift register module shown in FIG. 5.

FIG. 7 is another timing diagram of the first shift register module shown in FIG. 5. Optionally, in the first shift register module, during a process of outputting a valid pulse at the output end OUTC of the first shift output unit 111, the electrical signal of the first refresh driving line SQL remains a valid pulse, i.e., at a high level. A working process of the first shift register module includes:

In the t31 stage, the first refresh driving line SQL provides a high level, so that the eighth transistor M8 is turned off. The trigger signal end INS provides a low level, so that the seventh transistor M7 and the tenth transistor M10 are both turned on, then the node N2*a* is at a high level, and the node N2*b* is at a high level. The ninth transistor M9 is turned on, and the low level signal provided by the second power supply end VG2 is written into the second node N2. The eleventh transistor M11 is turned on, and the high level signal provided by the first power supply end VG1 is written into the output end OUTA of the refresh driving unit 112.

In the stage t32, the eighth transistor M8 remains turned off, the trigger signal end INS provides a high level, so that the seventh transistor M7 and the tenth transistor M10 are both turned off, then the node N2*a* remains at a high level, and the node N2*b* remains at a high level. The ninth transistor M9 and the eleventh transistor M11 are turned on, and the output end OUTA of the refresh driving unit 112 outputs a high level.

In the stage t33, the eighth transistor M8 remains turned off, the trigger signal end INS provides a low level, so that the seventh transistor M7 and the tenth transistor M10 are both turned on, then the node N2*a* is at a high level, and the node N2*b* is at a high level. The ninth transistor M9 and the eleventh transistor M11 are turned on, and the output end OUTA of the refresh driving unit 112 outputs a high level.

In the t34 stage, the first refresh driving line SQL provides a low level to turn on the eighth transistor M8. The trigger signal end INS provides a low level to turn on the seventh transistor M7 and the tenth transistor M10, then the node N2*b* is at a low level, and the ninth transistor M9 is turned off. The high level signal provided by the first power supply end VG1 is written into the second node N2, the twelfth transistor M12 is turned on, and the low level signal provided by the second power supply end VG2 is written into the output end OUTA of the refresh driving unit 112.

As shown in FIG. 7, in the duration when the output end OUTA of the refresh driving unit 112 provides a high level, the output end OUTC of the first shift output unit 111 provides a valid pulse, that is, a high level signal, then the second transistor M2 and the sixth transistor M6 are both turned on. The first node N1 is at a low level, then the third transistor M3 is turned on, and the high level signal provided by the first power supply end VG1 is written to the output end OUTB of the refresh control unit 113.

Figure 8:
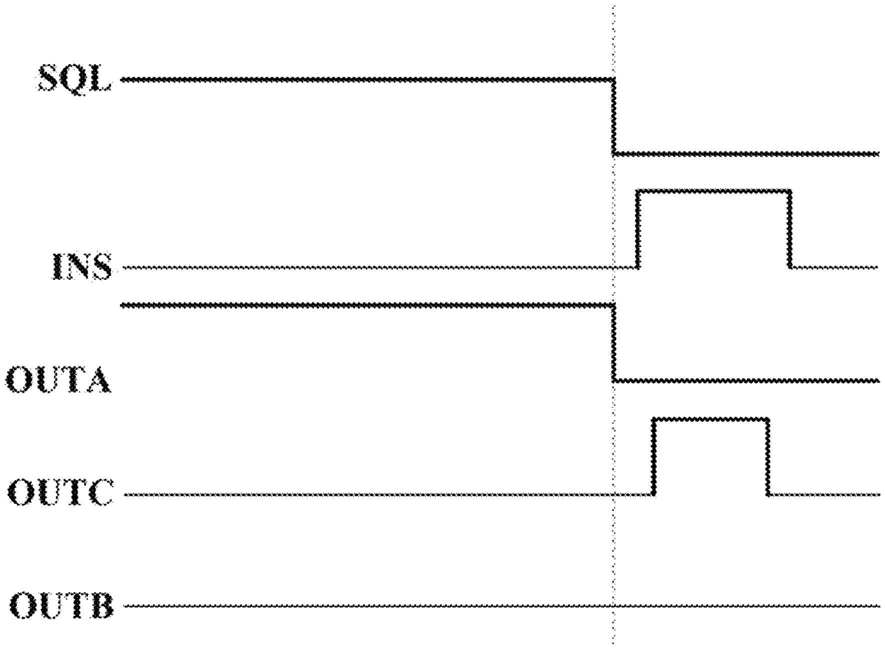
FIG. 8 is another timing diagram of the first shift register module shown in FIG. 5.

FIG. 8 is another timing diagram of the first shift register module shown in FIG. 5. As shown in FIG. 8, in the duration when the output end OUTA of the refresh driving unit 112 provides a high level, the output end OUTC of the first shift output unit 111 provides an invalid pulse, i.e., a low level signal, then the first transistor M1 and the fourth transistor M4 are both turned on, and the low level signal provided by the second power supply end VG2 is written to the output end OUTB of the refresh control unit 113. When the output end OUTA of the refresh driving unit 112 provides a low level signal, the fifth transistor M5 is turned on, the first node N1 is at a high level, then the fourth transistor M4 is turned on, and the low level signal provided by the second power supply end VG2 is written to the output end OUTB of the refresh control unit 113. In this way, the first driving circuit controls the corresponding pixel row to stop refreshing.

As described above, the first shift register module operates normally.

Figure 9:
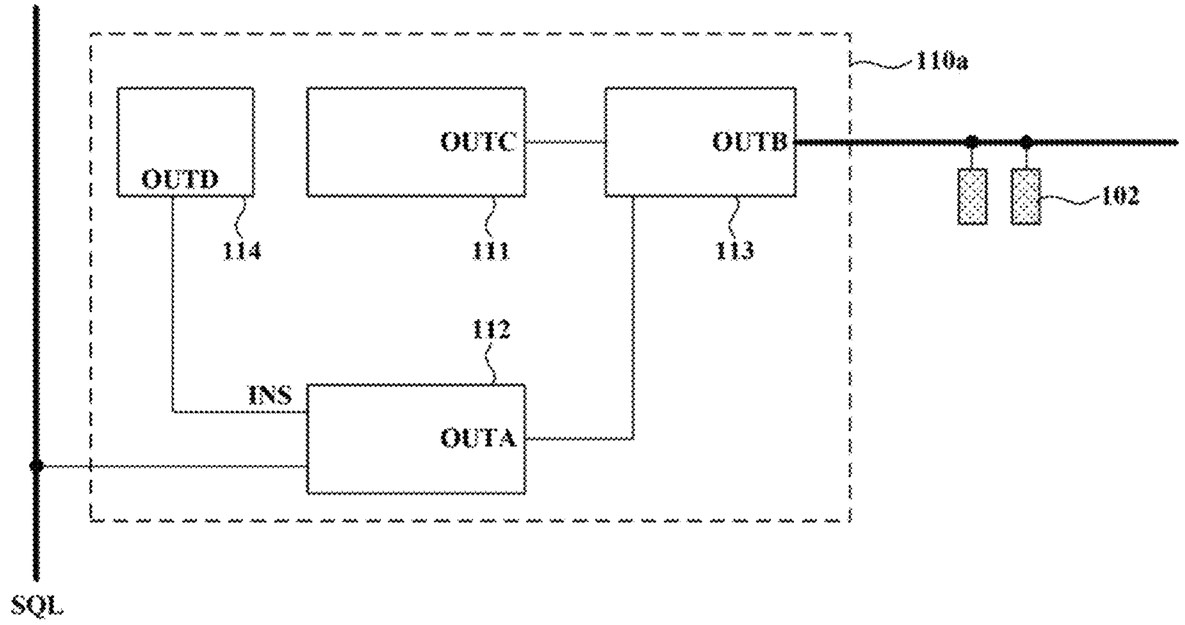
FIG. 9 is a schematic diagram of another first shift register module in accordance with an embodiment of the present disclosure.

FIG. 9 is a schematic diagram of another first shift register module in accordance with an embodiment of the present disclosure. As shown in FIG. 9, optionally, a first shift register module 110*a* further includes a second shift output unit 114, and an output end OUTD of the second shift output unit 114 is connected to the trigger signal end INS of the refresh driving unit 112. In the disclosed embodiment, the second shift output unit 114 provides a valid pulse or an invalid pulse to the trigger signal end INS of the refresh driving unit 112.

Optionally, the N-stage first shift register module includes N second shift output units, the output end of a second shift output unit of an i-th stage first shift register module is also connected to the shift trigger end of a second shift output unit of an (i+m)-th stage first shift register module, where m≥1.

The output end of the first shift output unit of the i-th shift register module may be connected to the shift trigger end of the first shift output unit of an (i+y)-th shift register module, where y≥1. In the disclosed embodiment, the N stages of first shift register modules are N stages of shift register modules, so the N-stage first shift register module satisfies: the output end of the first shift output unit of the i-th stage first shift register module is connected to the shift trigger end of the first shift output unit of the (i+y)-th stage first shift register module, where y≥1.

Figure 10:
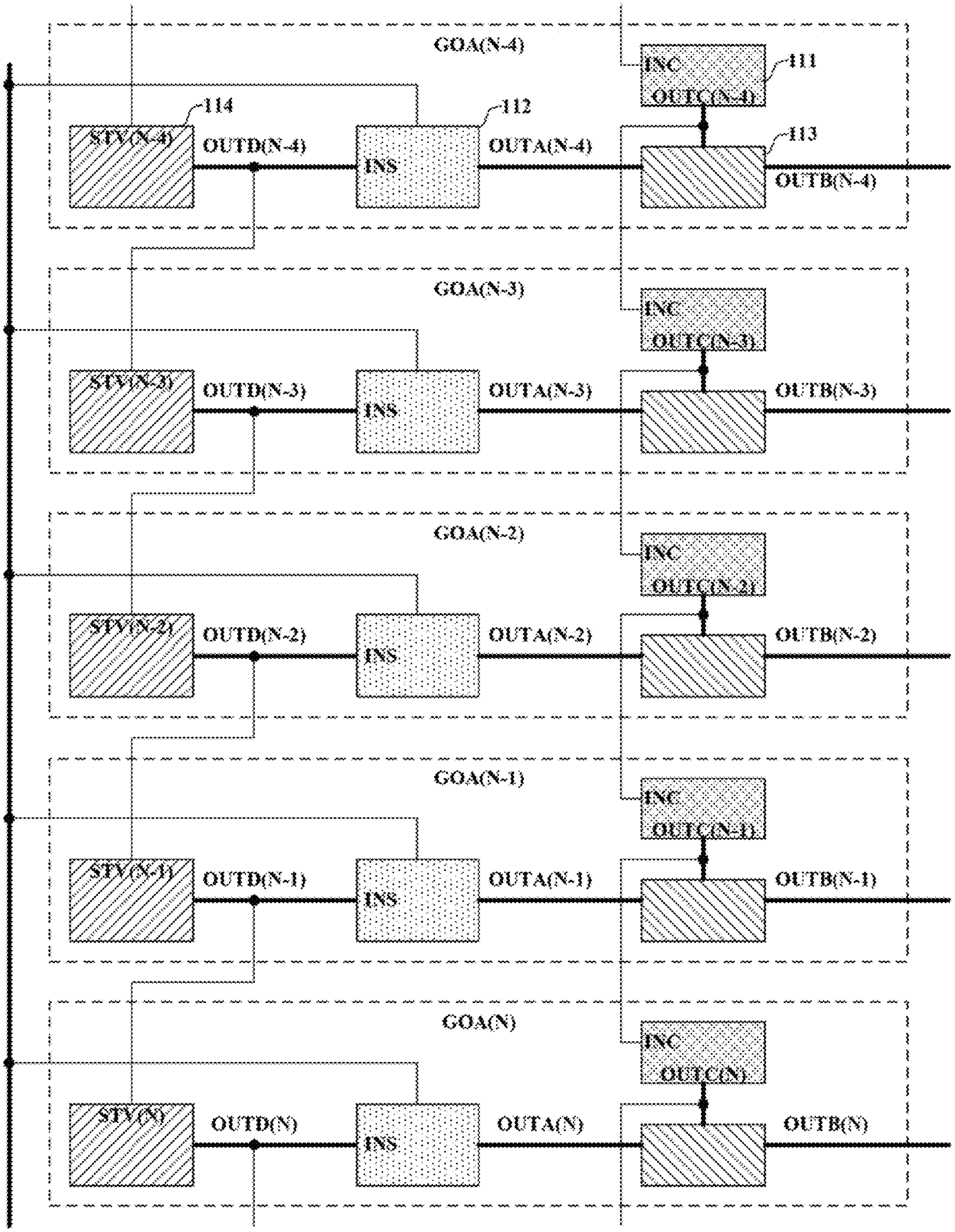
FIG. 10 is a schematic diagram of a multi-stage first shift register module in accordance with an embodiment of the present disclosure.

FIG. 10 is a schematic diagram of a multi-stage first shift register module in accordance with an embodiment of the present disclosure. As shown in FIG. 10, N may be greater than or equal to 5, and m=1. In the disclosed embodiment, the multi-stage first shift register module at least includes an (N−4)-th stage first shift register module GOA(N−4), an (N−3)-th stage first shift register module GOA(N−3), an (N−2)-th stage first shift register module GOA(N−2), an (N−1)-th stage first shift register module GOA(N−1), and an N-th stage first shift register module GOA(N).

Refer to FIG. 9 and FIG. 10, taking the (N−4)-th stage first shift register module GOA(N−4) as an example, the shift trigger end STV(N−4) of the second shift output unit 114 is connected to the output end OUTD of the second shift output unit of the first shift register module of the previous stage, the output end OUTD(N−4) of the second shift output unit 114 is connected to the trigger signal end INS of the corresponding refresh driving unit 112 and is also connected to the shift trigger end STV(N−3) of the second shift output unit of the of the next stage first shift register module GOA(N−3). Another signal end of the refresh driving unit 112 is also connected to the first refresh driving line SQL, and the output end OUTA(N−4) is connected to a signal end of the corresponding refresh control unit 113. The shift trigger end INC of the first shift output unit 111 is connected to the output end OUTC of the first shift output unit of the first shift register module of the previous stage, the output end OUTC(N−4) of the first shift output unit 111 is connected to another signal end of the corresponding refresh control unit 113 and is also connected to the shift trigger end INC of the first shift output unit of the next stage first shift register module GOA(N−3). The output end OUTB(N−4) of the refresh control unit 113 outputs a first driving signal.

It should be understood that the signal at the shift trigger end of the second shift output unit of the 1st stage first shift register module may come from the driving chip or from the output end of the second shift output unit of a dummy first shift register module. The signal at the output end of the second shift output unit of the first shift register module of the N-th stage may be transmitted to the driving chip or to the shift trigger end of the second shift output unit of the dummy first shift register module.

In other embodiments, m may be greater than 1.

The structure of the first shift output unit and the structure of the second shift output unit may be the same, which is not limited in the present disclosure. If the structure of the first shift output unit and the structure of the second shift output unit are the same, the manufacturing difficulty may be reduced. If the structure of the first shift output unit and the structure of the second shift output unit are different, the design flexibility of the first driving circuit may be improved.

Optionally, the working proc ess of the display panel includes at least one first display frame. A first display frame includes a refresh phase and a non-refresh phase. In the refresh phase, the output end of the first shift register module outputs a valid pulse, and in the non-refresh phase, the output end of the shift register module outputs an invalid pulse.

Optionally, the first refresh driving line SQL may provide a first refresh driving signal. In the refresh phase, the first refresh driving line SQL provides a valid pulse signal, and in the non-refresh phase, the first refresh driving line SQL provides an invalid pulse signal. In the disclosed embodiment, optionally, the valid pulse signal provided by the first refresh driving line SQL is a high level, and the invalid pulse signal provided by the first refresh driving line SQL is a low level, which is not limited in the present disclosure. If a product requires, it may be reasonably designed so that the valid pulse signal provided by the first refresh driving line is a low level and the invalid pulse signal is a high level.

Optionally, a second shift output unit outputs a second shift output signal. In the N-stage first shift register module, in the refresh phase, a phase of the second shift output signal of the i-th stage first shift register module is earlier than a phase of the second shift output signal of the (i+1)-th stage first shift register module, and the phase difference between the two is a*Hx, where 1≤i≤N−1, a is a positive integer greater than or equal to 1, and Hx is equal to the scanning duration of a sub-pixel row.

In the disclosed embodiment, the signal outputted by the output end OUTD of the second shift output unit 114 is a second shift output signal, and the second shift output signal is an electrical signal with alternating high and low levels. The output end OUTD of the second shift output unit 114 of an i-th stage first shift register module is connected to the shift trigger end STV of the second shift output unit 114 of an (i+m)-th stage first shift register module, so a phase of the second shift output signal of the i-th stage first shift register module is earlier than a phase of a second shift output signal of an (i+1)-th stage first shift register module.

Specifically, in the N-stage first shift register module, in the refresh phase, the phase difference between the second shift output signal of the i-th stage first shift register module and the second shift output signal of the (i+1)-th stage first shift register module is a*Hx, where a is a positive integer greater than or equal to 1, and Hx is equal to the scanning duration of a sub-pixel row. Optionally, in the refresh phase, the phase difference between the second shift output signal of the i-th stage first shift register module and the second shift output signal of the (i+1)-th stage first shift register module is 1*Hx, and second shift output units of the multi-stage first shift register module are cascaded, which may provide a corresponding trigger signal to a refresh driving unit 112 in the multi-stage first shift register module.

Optionally, a second shift output unit outputs a second shift output signal. For 1st stage to (N−1)-th stage first shift register modules in the N-stage first shift register module, in the refresh phase, the valid pulse duration of a first refresh driving signal overlaps with the valid pulse duration of a second shift output signal.

Optionally, the overlapping duration of the valid pulse duration of the first refresh driving signal and the valid pulse duration of the second shift output signal may be ta, ta≥Hy, where Hy is the valid pulse width output by a first shift output unit.

Optionally, a second shift output unit may output a second shift output signal. For the N-th stage first shift register module in the N-stage first shift register module, in the refresh phase, the valid pulse duration of the first refresh driving signal does not overlap with the valid pulse duration of the second shift output signal.

Optionally, the first shift output unit may output a first shift output signal. The valid pulse width of the first shift output signal is one valid pulse.

Figure 11:
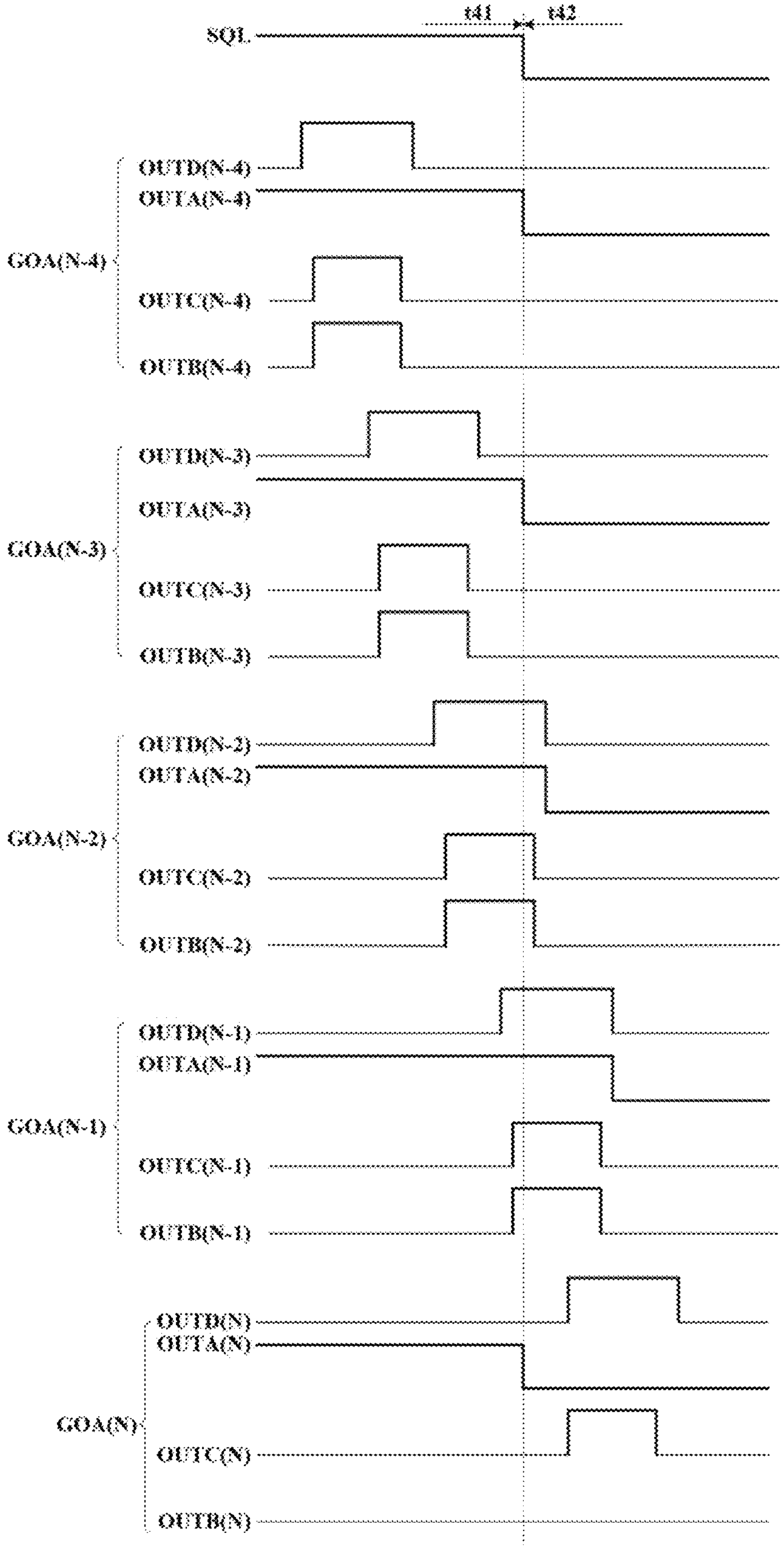
FIG. 11 is a timing diagram of the multi-stage first shift register module shown in FIG. 10.

Based on the above embodiments, an embodiment of the present disclosure provides a timing sequence of a multi-stage first shift register module. FIG. 11 is a timing diagram of the multi-stage first shift register module shown in FIG. 10. Optionally, the first display frame includes a refresh phase t41 and a non-refresh phase t42. In the refresh phase t41, the first refresh driving line SQL provides a high level, and in the non-refresh phase t42, the first refresh driving line SQL provides a low level.

For 1st stage to (N−1)-th stage first shift register modules in the N-stage first shift register module, in the refresh phase t41, a high-level phase of the first refresh driving line SQL overlaps with a high-level phase output by a second shift output unit 114. Specifically, for the second shift output unit 114 of any stage of the 1st stage to the (N−3)-th stage first shift register modules, all high-level phases of its output end OUTD are completely located in the refresh phase t41. For the second shift output unit 114 of any stage of (N−2)-th to (N−1)-th stage first shift register modules, part of the high-level phase of its output end OUTD is located in the refresh phase t41 and the remaining of the high level phase is located in the non-refresh phase t42.

For the N-th stage first shift register module in the N-stage first shift register modules, all of the high-level phase of the output end OUTD(N) of the second shift output unit 114 is in the non-refresh phase t42.

In the refresh phase t41, output ends OUTB of the 1st stage to the (N−1)-th stage first shift register modules sequentially output valid pulses, i.e., high levels. In the non-refresh phase t21, output ends OUTB(N) of the shift register modules output invalid pulses, i.e., low levels. Here, the valid pulse of the output end OUTB(N−2) of the (N−2)-th stage first shift register module GOA(N−2) and the valid pulse of the output end OUTB(N−1) of the (N−1)-th stage first shift register module GOA(N−1) will not have phase switched by the high and low levels of the first refresh driving line SQL. Therefore, in the non-refresh phase t42, the valid pulse of the output end OUTB(N−2) of the (N−2)-th stage first shift register module GOA(N−2) may be fully output and then leap to a low level, and the valid pulse of the output end OUTB(N−1) of the (N−1)-th stage first shift register module GOA(N−1) may be fully output and then leap to a low level.

For the output process of the 1st stage to the (N−3)-th stage first shift register modules, refer to the timing sequence in FIG. 7. For the output process of the (N−2)-th stage first shift register module GOA(N−2) and the output process of the (N−1)-th stage first shift register module GOA(N−1), refer to the timing sequence in FIG. 6, details of which will not be described herein.

For the N-th stage first shift register module in the N-stage first shift register modules, all high-level phases of the output end OUTD(N) of its second shift output unit 114 are in the non-refresh phase t42. Based on this, the output end OUTA(N) of its refresh driving unit 112 provides a valid pulse, i.e., a high level, in the refresh phase t41 and provides an invalid pulse, i.e., a low level, in the non-refresh phase t42, and all high-level phases of the output end OUTC(N) of the first shift output unit 111 are in the non-refresh phase t42. Therefore, referring to FIG. 8, in the refresh phase t41, OUTA(N) provides a high level, OUTC(N) provides a low level, then the first transistor M1 and the fourth transistor M4 are both turned on, and OUTB(N) provides a low level. In the non-refresh phase t42, OUTA(N) provides a low level no matter whether OUTC(N) provides a high level or a low level, then the fifth transistor M5 and the fourth transistor M4 are both turned on, and OUTB(N) provides a low level. In this way, the pixel row corresponding to the N-th stage first shift register module may be controlled to stop refreshing.

A first shift output unit may output a first shift output signal. The valid pulse width of the first shift output signal may include two consecutive valid pulses, and the valid pulse duty of the valid pulse width of the first shift output signal may be greater than or equal to ⅔.

Figure 12:
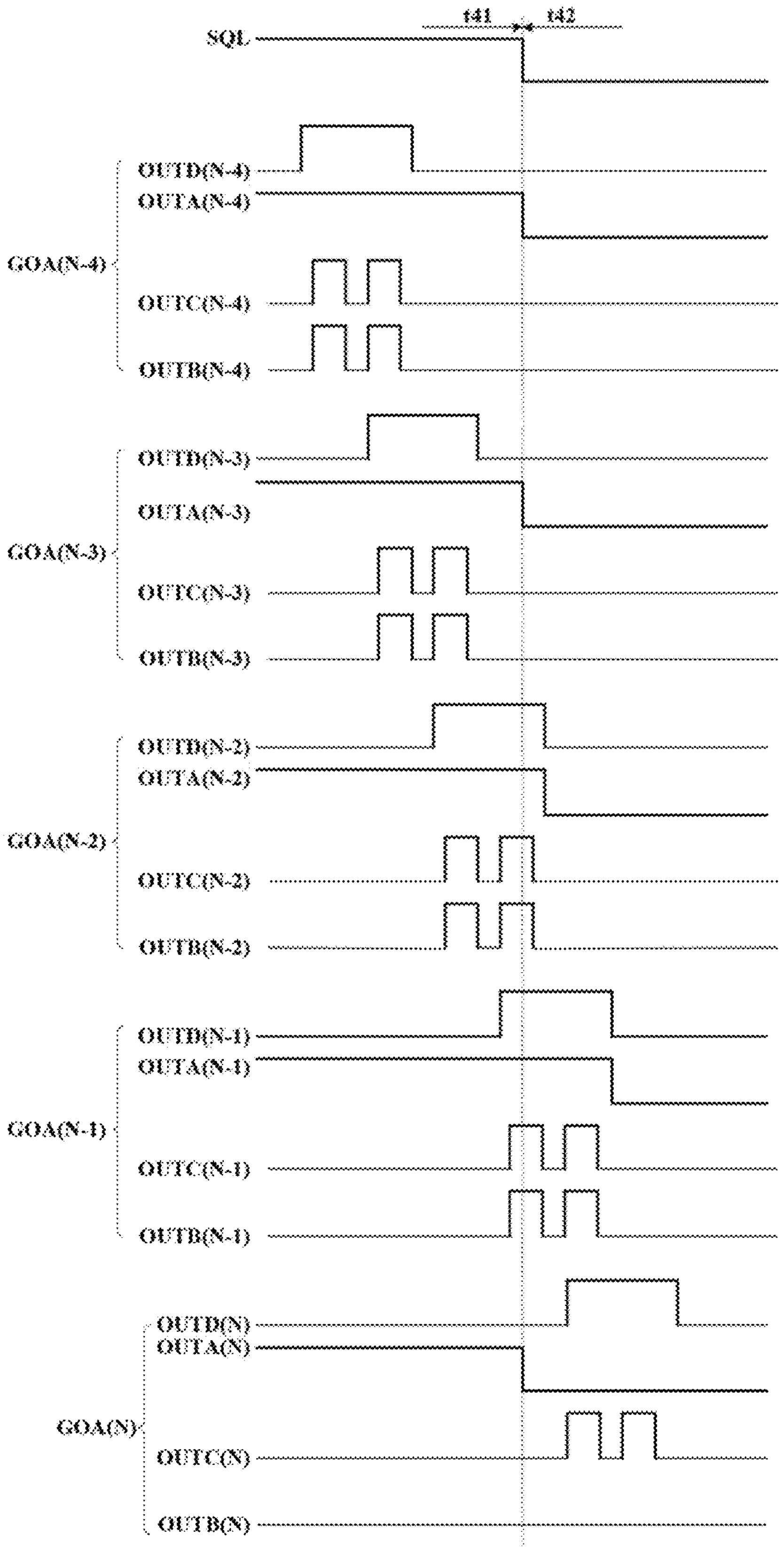
FIG. 12 is another timing diagram of the multi-stage first shift register module shown in FIG. 10.

FIG. 12 is another timing diagram of the multi-stage first shift register module shown in FIG. 10. The difference from FIG. 11 is that in the embodiment disclosed herein, the output end OUTC of the first shift output unit outputs a first shift output signal, and the valid pulse width of the first shift output signal includes two consecutive valid pulses, and the valid pulse duty in the valid pulse width of the first shift output signal is greater than or equal to ⅔.

Refer to FIG. 5 and FIG. 12, for a first shift register module, in a duration when the output end OUTA of the refresh driving unit 112 provides a high level, if the output end OUTC of the first shift output unit 111 leaps to a high level signal, the second transistor M2, the sixth transistor M6 and the third transistor M3 are all turned on, and the output end OUTB of the refresh control unit 113 outputs a high level. If the output end OUTC of the first shift output unit 111 leaps to a low level signal, the first transistor M1 and the fourth transistor M4 are both turned on, and the output end OUTB of the refresh control unit 113 outputs a low level.

For a first shift register module, in a duration when the output end OUTA of the refresh driving unit 112 provides a low level, no matter whether the output end OUTC of the first shift output unit 111 leaps to a high level or a low level, the fifth transistor M5 and the fourth transistor M4 are both turned on, and the output end OUTB of the refresh control unit 113 outputs a low level. In this way, the first driving circuit controls the corresponding pixel row to refresh in the refresh phase t41, and the first driving circuit controls the corresponding pixel row to stop refreshing in the non-refresh phase t42.

It should be understood that the valid pulse width of the first shift output signal output by the first shift output unit may also include three or more consecutive valid pulses. The valid pulse duty in the valid pulse width of the first shift output signal is not limited to ⅔ and may be reasonably adjusted according to product requirements.

Figure 13:
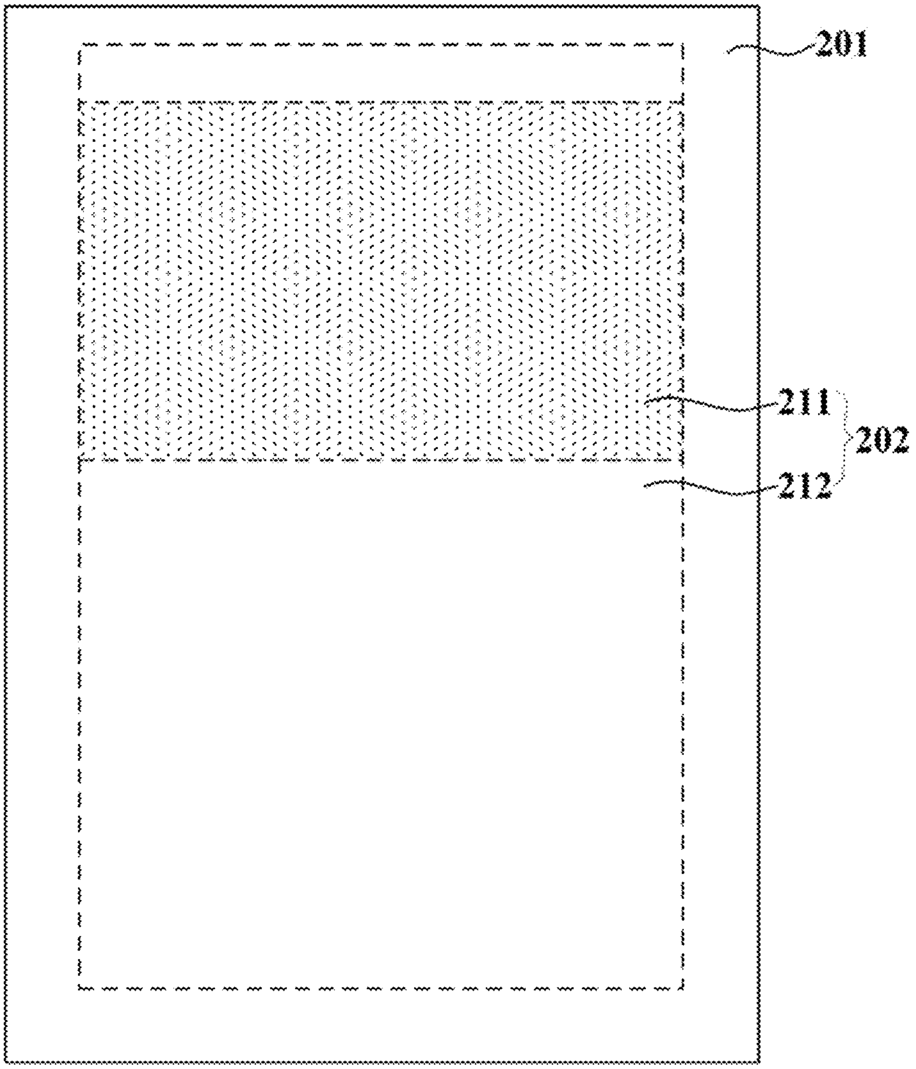
FIG. 13 is a schematic diagram of another display panel in accordance with an embodiment of the present disclosure.

FIG. 13 is a schematic diagram of another display panel in accordance with an embodiment of the present disclosure. As shown in FIG. 13, the display panel may optionally include a first display area 211 and a second display area 212. Multiple stages of shift register modules correspondingly connected to the multiple sub-pixel rows in the first display area 211 are all first shift register modules. Multiple stages of shift register modules corresponding connected to the multiple sub-pixel rows in the second display area 212 are not first shift register modules.

In the disclosed embodiment, the display panel includes a non-display area 201 and a display area 202, and the display area 202 includes the first display area 211 and the second display area 212.

Referring to FIG. 3, FIG. 4 and FIG. 13, the non-display area 201 is provided with a first driving circuit 101, where the first driving circuit 101 includes multiple stages of shift register modules 110. Each stage of shift register module 110 includes a first shift output unit 111.

Multiple stages of shift register modules correspondingly connected to the multiple sub-pixel rows of the first display area 211 are all first shift register modules 110*a*. Specifically, a first shift register module 110*a* includes not only a first shift output unit 111, but also a refresh driving unit 112 and a refresh control unit 113. The first driving circuit 101 may control the multiple stages of first shift register modules 110*a* corresponding to the first display area 211 to refresh during the refresh phase.

Multiple stages of shift register modules correspondingly connected to the multiple sub-pixel rows in the second display area 212 are not first shift register modules. Specifically, in the second display area 212, a shift register module 110 may only include a first shift output unit 111, but not a refresh driving unit and a refresh control unit.

Apparently, relevant persons in the art may reasonably design the position and size of the first display area according to product or user requirements, and may even design each shift register module in the first driving circuit to be a first shift output unit, so that the first display area may be flexibly defined and refreshed.

Figure 14:
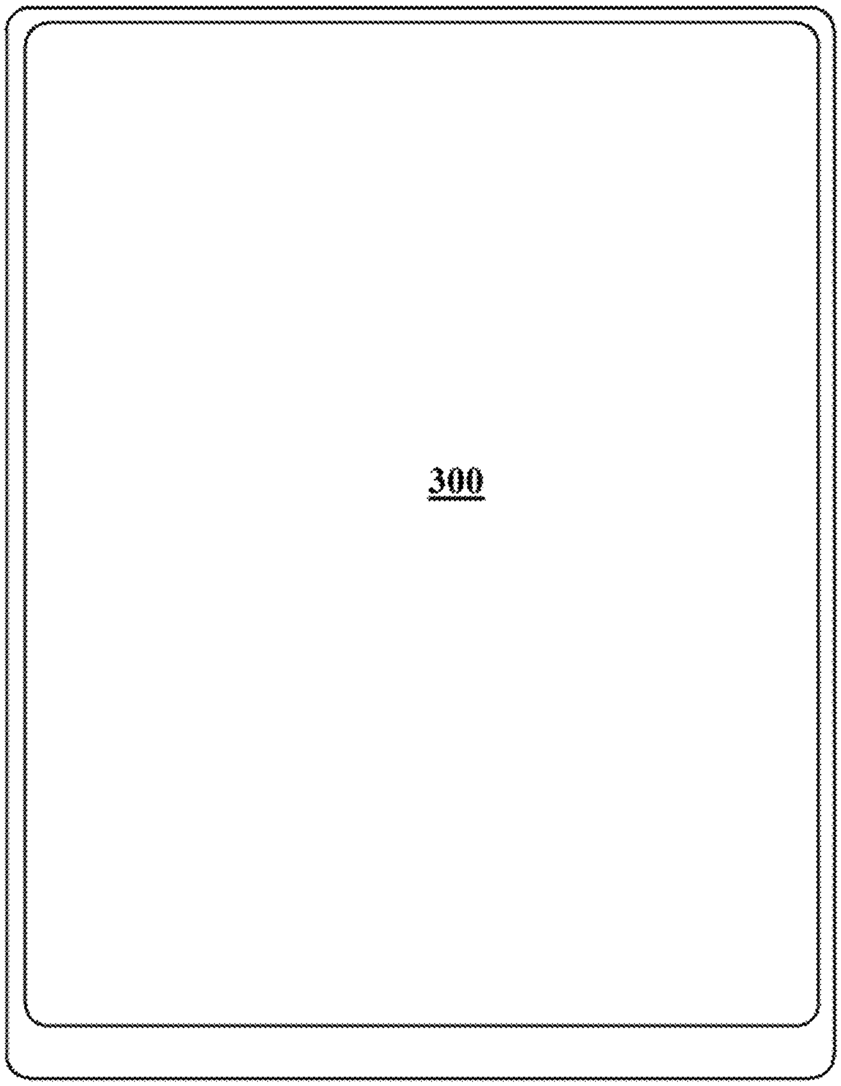
FIG. 14 is a schematic diagram of a display device in accordance with an embodiment of the present disclosure.

Based on the same inventive concept, an embodiment of the present disclosure further provides a display device, which includes a display panel as described in any of the above embodiments. FIG. 14 is a schematic diagram of a display device in accordance with an embodiment of the present disclosure. As shown in FIG. 14, the display device in accordance with an embodiment of the present disclosure has the corresponding functional modules and beneficial effects of a display panel as described in any of the above embodiments. The display device may be an end device such as a smart phone, a car display, a tablet computer, a laptop computer, a super mobile personal computer, a netbook, a smart wearable device, an augmented reality (AR)/virtual reality (VR) device, etc. The display panel may be a display panel of any display type, such as a micro light-emitting diode display panel or an organic light-emitting display panel, which is not limited by the embodiments of the present disclosure.

In the embodiments disclosed herein, a refresh driving unit is further introduced, where the refresh driving unit provides a pulse control signal under the control of a first refresh driving line and a trigger signal end. The pulse control signal may control an output duration of a valid pulse of a refresh control unit, so that an output signal of each stage of the first shift register module corresponding to the display partition may be complete, and the problem of the valid pulse output by a last stage first shift register module corresponding to the display partition being cut off will not occur. In this way, problems such as image sticking or screen jitter may be prevented from occurring in the display partition, thereby improving the display performance.

The specific embodiments above do not constitute a limitation on the scope of protection of the present disclosure. It should be understood by those skilled in the art that various modifications, combinations, sub-combinations and substitutions may be made according to design requirements and other factors. Any modification, equivalent substitution and improvement made within the spirit and principle of the present disclosure should be included in the scope of protection of the present disclosure.

What is claimed is:

1. A display panel, comprising:

a first driving circuit and a plurality of rows of sub-pixels, wherein:

the first driving circuit includes a first refresh driving line and a multi-stage shift register module, wherein a stage of shift register module is correspondingly connected to at least a row of sub-pixels, and a shift register module includes a first shift output unit;

in the multi-stage shift register module, there are N stages of shift register modules being N stages of first shift register modules, N≥2; and a first shift register module also includes a refresh driving unit and a refresh control unit, wherein a first signal end of the refresh driving unit is connected to the first refresh driving line, a second signal end of the refresh driving unit is connected to a trigger signal end, and an output end of the refresh driving unit is connected to a first end of the refresh control unit, a second end of the refresh control unit is connected to an output end of the first shift output unit, an output end of the refresh control unit is connected to a row of sub-pixels, and the refresh driving unit is configured to generate a pulse control signal, based on a combination of a signal received from the first refresh driving line and a signal received from the trigger signal end, to control a valid pulse output duration of the refresh control unit such that the valid pulse output by the refresh control unit is prevented from being cut off during a partition boundary of a display partition.

2. A display panel, comprising:

a first driving circuit and a plurality of rows of sub-pixels, wherein:

the first driving circuit includes a first refresh driving line and a multi-stage shift register module, wherein a stage of shift register module is correspondingly connected to at least a row of sub-pixels, and a shift register module includes a first shift output unit;

in the multi-stage shift register module, there are N stages of shift register modules being N stages of first shift register modules, N≥2; and a first shift register module also includes a refresh driving unit and a refresh control unit, wherein a first signal end of the refresh driving unit is connected to the first refresh driving line, a second signal end of the refresh driving unit is connected to a trigger signal end, and an output end of the refresh driving unit is connected to a first end of the refresh control unit, a second end of the refresh control unit is connected to an output end of the first shift output unit, an output end of the refresh control unit is connected to a row of sub-pixels, and the refresh driving unit is configured to provide a pulse control signal to control a valid pulse output duration of the refresh control unit, wherein:

the refresh control unit includes a first transistor, a second transistor, a third transistor and a fourth transistor;

a gate of the first transistor is connected to the output end of the first shift output unit, and the first transistor is connected between a first power supply end and a first node;

a gate of the second transistor is connected to the output end of the refresh driving unit, and the second transistor is connected between a second power supply end and the first node; and a gate of the third transistor and a gate of the fourth transistor are both connected to the first node, an output end of the third transistor and an output end of the fourth transistor are both connected to the output end of the refresh control unit, an input end of the third transistor is connected to the first power supply end, and an input end of the fourth transistor is connected to the second power supply end.

3. The display panel according to claim 2, wherein:

the refresh control unit further includes a fifth transistor and a sixth transistor;

a gate of the fifth transistor is connected to the output end of the refresh driving unit, and the fifth transistor is connected between the first power supply end and the first node;

a gate of the sixth transistor is connected to the output end of the first shift output unit, and the second transistor is connected to the second power supply end through the sixth transistor.

4. The display panel according to claim 1, wherein:

the refresh driving unit includes a seventh transistor, an eighth transistor, a ninth transistor, a tenth transistor, an eleventh transistor, a twelfth transistor and a first capacitor;

the seventh transistor, the eighth transistor and the ninth transistor are connected in sequence, a gate of the seventh transistor is connected to the trigger signal end and another end of the seventh transistor is connected to a first power supply end, a gate of the eighth transistor is connected to the first refresh driving line, a gate of the ninth transistor is connected to a first end of the tenth transistor and another end of the ninth transistor is connected to a second power supply end, and a connecting point between the eighth transistor and the ninth transistor is a second node;

a gate of the tenth transistor is connected to the trigger signal end and a second end of the tenth transistor is connected to the first refresh driving line, and a first end of the tenth transistor is connected to the first power supply end through the first capacitor; and a gate of the eleventh transistor and a gate of the twelfth transistor are both connected to the second node, the eleventh transistor is connected between the first power supply end and the output end of the refresh driving unit, and the twelfth transistor is connected between the second power supply end and the output end of the refresh driving unit.

5. The display panel according to claim 4, wherein:

the seventh transistor, the eighth transistor, the tenth transistor and the eleventh transistor are of the same transistor type; and the ninth transistor and the twelfth transistor are of the same transistor type.

6. The display panel according to claim 1, wherein, the first shift register module further includes a second shift output unit, and an output end of the second shift output unit is connected to a trigger signal end of the refresh driving unit.

7. The display panel according to claim 6, wherein:

the N stages of first shift register modules include N second shift output units; and an output end of a second shift output unit of an i-th stage first shift register module is also connected to a shift trigger end of a second shift output unit of an (i+m)-th stage first shift register module, wherein m≥1.

8. The display panel according to claim 6, wherein, a structure of the first shift output unit is the same as a structure of the second shift output unit.

9. The display panel according to claim 6, wherein:

an operation process of the display panel includes at least one first display frame;

the first display frame includes a refresh phase and a non-refresh phase;

in the refresh phase, an output end of the first shift register module outputs a valid pulse; and in the non-refresh phase, the output end of the first shift register module outputs an invalid pulse.

10. The display panel according to claim 9, wherein:

the first refresh driving line provides a first refresh driving signal;

in the refresh phase, the first refresh driving line provides a valid pulse signal; and in the non-refresh phase, the first refresh driving line provides an invalid pulse signal.

11. The display panel according to claim 9, wherein:

the second shift output unit outputs a second shift output signal; and in the N stages of first shift register modules, in the refresh phase, a phase of a second shift output signal of an i-th stage first shift register module is earlier than a phase of a second shift output signal of an (i+1)-th stage first shift register module, and a phase difference between the two is a*Hx, wherein, 1≤i≤N−1, a is a positive integer greater than or equal to 1, and Hx is equal to a scanning time length of the row of sub-pixels.

12. The display panel according to claim 10, wherein:

the second shift output unit outputs a second shift output signal; and for 1st stage to (N−1)-th stage first shift register modules in the N stages of first shift register modules, in the refresh phase, a valid pulse duration of the first refresh driving signal overlaps with a valid pulse duration of the second shift output signal.

13. The display panel according to claim 12, wherein:

an overlap duration of the valid pulse duration of the first refresh driving signal and the valid pulse duration of the second shift output signal is ta, wherein ta≥Hy, and Hy is a valid pulse width output by the first shift output unit.

14. The display panel according to claim 10, wherein:

the second shift output unit outputs a second shift output signal; and for a N-th stage first shift register module in the N stages of first shift register modules, in the refresh phase, a valid pulse duration of the first refresh driving signal does not overlap with a valid pulse duration of the second shift output signal.

15. The display panel according to claim 1, wherein:

the first shift output unit outputs a first shift output signal; and a valid pulse width of the first shift output signal includes two consecutive valid pulses.

16. The display panel according to claim 15, wherein a valid pulse duty in the valid pulse width of the first shift output signal is greater than or equal to ⅔.

17. The display panel according to claim 1, wherein:

the first shift output unit outputs a first shift output signal; and a valid pulse width of the first shift output signal is one valid pulse.

18. The display panel according to claim 1, wherein an output end of a first shift output unit of an i-th stage shift register module is connected to a shift trigger end of a first shift output unit of an (i+y)-th stage shift register module, wherein y≥1.

19. A display panel, comprising:

a first driving circuit and a plurality of rows of sub-pixels, wherein:

the first driving circuit includes a first refresh driving line and a multi-stage shift register module, wherein a stage of shift register module is correspondingly connected to at least a row of sub-pixels, and a shift register module includes a first shift output unit;

in the multi-stage shift register module, there are N stages of shift register modules being N stages of first shift register modules, N≥2; and a first shift register module also includes a refresh driving unit and a refresh control unit, wherein a first signal end of the refresh driving unit is connected to the first refresh driving line, a second signal end of the refresh driving unit is connected to a trigger signal end, and an output end of the refresh driving unit is connected to a first end of the refresh control unit, a second end of the refresh control unit is connected to an output end of the first shift output unit, an output end of the refresh control unit is connected to a row of sub-pixels, and the refresh driving unit is configured to provide a pulse control signal to control a valid pulse output duration of the refresh control unit, wherein:

the display panel includes a first display area and a second display area;

multi stages of shift register modules correspondingly connected to multiple sub-pixel rows in the first display area are all the first shift register modules; and multi stages of shift register modules correspondingly connected to multiple sub-pixel rows in the second display area are not the first shift register modules.

20. A display device, including at least one display panel according to claim 1.

* * * * *